UNITED STATES PATENT OFFICE.

ROBERT M. THOMPSON, OF TACOMA, WASHINGTON.

PROCESS OF RECOVERING PRODUCTS FROM WHOLE FISH OF THE SHARK FAMILY AND FROM OFFAL OF THESE AND OTHER FISH.

1,413,200.  Specification of Letters Patent.  Patented Apr. 18, 1922.

No Drawing.  Application filed April 24, 1919.  Serial No. 292,407.

*To all whom it may concern:*

Be it known that I, ROBERT M. THOMPSON, a citizen of the United States, residing at Tacoma, in the county of Pierce and State of Washington, have invented certain new and useful Improvements in a Process of Recovering Products from Whole Fish of the Shark Family and from Offal of These and Other Fish, of which the following is a specification.

My invention relates to a process of recovering products from whole fish of the shark family and from offal of these and other fish, chief among which products are oils, animal foods and fertilizer.

Heretofore, two processes have been in common use to effect such recovery: First, or "wet process; the fish are cooked in digestors to break the tissues to release the oil and then subjected to mechanical pressure, in order to express the moisture and oil content, without first reducing to any appreciable extent the moisture content separately by evaporation of the moisture found in the original fish. By this process, the moisture and oil are expressed together and thereafter the oil and moisture are separated. The solid residue remaining after expressing the oil and moisture is then dried and ground to form a meal. The objection to this procedure is that all the moisture pressed out contains a considerable portion of the soluble proteins and other nitrogenous compounds. These soluble compounds thus pressed out are ordinarily wasted, unless used in the manufacture of glue. At the same time, these compounds, if retained and dried, would become the most valuable part of the solid parts or meal, because they constitute the immediately available food, (either for plant or animal life). The availability of these compounds is due to their solubility and other chemical condition, rendering them capable of being readily assimilated either by animal or vegetable life.

Second, or "dry" or extraction process; also another common process is to put the material, after being cooked, into an evaporator and evaporate all the moisture down to a point where it is commonly called dry (i. e. about 10% moisture content). This leaves all the oil in the meal, and causes all the moisture, except said 10%, normally held by capillary capacity, to be driven off, so that when it comes to expressing the oil, only a small percentage of the total oil can be recovered by pressing it, since the oil now replaces, in the interstices of the mixture, what otherwise or normally would be occupied by moisture,— the capillary attraction of moisture being much greater for the fish fibre than the oil. It has not been found practicable to create pressure sufficiently great to effectively overcome such capillary attraction and therefore a solvent or extraction process to recover the residual oil in the meal is necessary. Otherwise, the oil waste is too great, and the plant food value of the meal for fertilizer is greatly reduced, owing to the fact that the availability of the plant food content of such meal is greatly retarded, since the excessive oil saturation serves as a repellent to water, and water is necessary in producing the solutions, the formation of which are essential before assimilation by plants can take place. While this meal is valuable for animal food, nevertheless such meal is not paid for on the basis of the oil content, but entirely on the basis of the protein and bone phosphate of lime content. Further objection to this extraction process arises from the fact that the solvent is expensive, as well as unusually dangerous, since highly volatile and explosive solvents are commonly used. Furthermore, the oil recovered by evaporating the solvent is of much lessened value, being often difficult to sell; even though at the same time the expressed oil may have a comparatively good market. The presence of the solvent likewise reduces the value of the meal.

Regarding the special conditions involved in connection with the manufacture of such products from members of the shark family, it is to be noted that such fish have no true bone skeleton but rather a cartilaginous bone skeleton, which when cooked becomes a gelatinous mass which is, to a large extent, of a protein composition and is soluble, so that important food values will be lost in the liquid, provided the first or "wet" process is used. A further difficulty is that such absence of true bone structure causes said fish fibre to be unadaptable to form a filter (or porous) effect within itself, and affords no reinforcing means within itself for purposes of draining or straining and, due to its unimpeded fluidity, bursts the press cloths when subjected to high pressure, since the press cloths must sustain all the pressure. Moreover, the absence of such bony structure, together with the gelatinous character of the mass, permits the forming of an impermeable structure which renders the expressing of the oil entirely impracticable. This condition is due to the presence of an excessive quantity of moisture. These considerations render the first or wet process hereinabove set forth wholly inapplicable to fish of the shark family, because pressure cannot be produced on account of the bursting of the press cloths and the impermeable character of the mass, and also because such a large percentage of the food values are in a soluble form which are carried off by such of the liquid as may be expressed and so wasted. The second or dry process hereinabove set forth is objectionable for the same reason as for other fish.

The object of my invention is to provide a porcess of recovering products from the whole fish of the shark family and of the offal of these and other fish, chief among which products are oils, animal foods and fertilizers, whereby the largest possible percentage of such animal oils may be recovered without the use of solvents, and to provide a process whereby the fish meals produced contain all the original nutriments, other than the oil, for animal and plant life, and in such a form that said foods are most promptly available for assimilation by both plant and animal life—losing no part of the original fish except moisture content in the form of steam (except some ammonia gas). Further, it is a part of my object to achieve this result with the simplest form of equipment possible by utilizing the same cooking vats or retorts for the cooking and the drying, and to further reduce the meal to a fine consistency by means of a revolving paddle or agitator mechanism constructed in said vats; and to provide a process whereby said simple equipment in connection with a press is capable of expressing the oil and preparing the fish meal for storage only, of as great a quantity as possible during the rush season, the balance of the processing, as respects the meal, to be completed at leisure and to simplify the separation and recovery of the oil from other liquids.

In general, I attain these results by permitting the capillary capacity of the mass of fish fibre to retain only such portion of the moisture content of the fish during the first stages of the process as will provide a filling for the interstices in the fibre mass. This moisture excludes the oil from such spaces, i. e. so much of the oils as are recoverable, and by so much aids in the expressing of the oil. Moisture has a greater capillary affinity for the fish fibre than has the oil and so permits the oil to first flow off when subjected to pressure. Further, by evaporating said free moisture content, instead of expressing the same, I provide for retention in the meal of the soluble food values, which otherwise would be lost.

My process consists in first evaporating in a steam-jacketed vat or cooker provided with a revolving paddle or agitator mechanism, the moisture content from the fish meat to a point where the free moisture is practically eliminated, that is to a point where approximately 50 to 60 per cent only of the remaining mass, after the expressing of the oil is moistrue content. A preferable form of vat or cooker is the cylindrical, with two openings on top near each end and an end door. My test for knowing when the free moisture is evaporated, as respects dogfish or grayfish, is by noting the condition of the tissue of the fish eyeballs. These are naturally, after heating, of an opaque character and as the heat drives off the free moisture the eyeball tissue becomes centrally translucent, and when this translucent condition has proceeded to the point where the opaque condition is but about one thirty-second of an inch in thickness, my experience is that the free moisture is practically eliminated.

Another test, applicable to other fish as well as members of the shark family, for determining when the free moisture is about all eliminated, is to note the quantity of steam that may be coming out of the vat. When this is very little, then the free moisture is practically gone. Also, by squeezing the meal in the hand, it can be determined whether the moisture is eliminated. If any moisture remains on the hand, the evaporation step should continue. The capillary capacity of the mass retains such moisture as may remain, in the form of a thick glue liquid and also some portion of the oil, for the reason that said oil also is a liquid and is therefore subject to capillary force in the same manner, but to a less degree, as is the moisture, i. e. glue liquid. Having eliminated the free moisture, I then draw off the contents of the retort and cause the material to be placed in press cloths. These, arranged in tiers, are then subjected to pressure, which operation presses out the oil. The removing of only the free moisture makes possible a recovery of a very much larger percentage of oil than is otherwise commonly recoverable, because leaving the water content to remain provides for the filling of the interstices with water, which thus serves as an excluder of the oil. Also, there is a very much less quantity of expressed liquid to contend with due to the original evaporating step and less separation difficulties are encountered in the tanks, due to the fact that such moisture content as remains is in the form of a thick glue and oil emulsion, both of which are readily separable from the oil. Also, the evaporation of the free misture avoids the presence of the excessive liquid at the time of expressing, which excessive liquid permits the forming of an impermeable mass within the press cloths, so that the expressing of the oil is impracticable. The pressure is continued and increased until finally appears the said thick, heavy, sticky fluid, being glue, and a heavy oil emulsion. When this appears and the oil flow ceases, it is my experience that all the oil that can be advantageously freed by pressure has been secured. The said heavy, sticky fluid and oil emulsion are readily separated from the oil by gravity. I provide an outlet for the oil a short distance above the bottom of the shipping or storage tanks, which are also used as settling tanks. The heavy oil emulsion and glue substance I draw off from the bottom and return to the original cooking retorts or vats, thereby eliminating all oil losses and all soluble protein losses by subjecting them in conjunction with a new charge of fish to a repetition of the first step, namely evaporating before expressing. The expressed oil drawn off above the bottom of the tank is of the finest grade and requires no refining process. The percentage of oil and moisture present in different fish and different refuse varies, so that in addition to the previous tests for determining whether the free moisture is all eliminated it is necessary to watch and study the first new batches and when the glue appears, if this is thin, then the next batch should evaporate for a longer period, so as to eliminate more of the moisture and thereby make the glue more dense. After such determination has been made, a standard of condition to commence expression has been established, for succeeding batches of similar material, it being remembered that different kinds of fish and refuse may constitute the different batches.

It will be remembered that fish, and fish refuse, from canneries and the like can often be obtained in large quantities only at certain times of the year, so that a great capacity is necessary in the apparatus for the recovery of products from fish and fish offal unless some method such as my invention is employed. Even during such favorable seasons, the fish supply is not uniform; weather as well as other conditions determining the same. After the oil is expressed as above set forth the partially dried meal is stored. Upon the conclusion of the rush periods the fish meal is further treated by re-heating in the said retorts having revolving paddles, and all moisture eliminated to a point of dryness, that is to a point of approximately 10% moisture content. During said process, the meal is ground to a fine consistency by the revolving paddles of the retort. This meal is then ready to be mixed with such other substances as may be desired to make fertilizer. The great increase in capacity thus provided for by my process is apparent when it is noted that the evaporation step before expressing the oil requires about seven hours while the evaporation to dryness step after expressing the oil requires about sixteen hours—the vats being of about five ton capacity, and having approximately 200 square feet of heating surface. The contents are subjected to the heat developed by having about thirty pounds of steam pressure in the jacket. Thus the capacity of only a two cooker unit plant is more than tripled for saving the raw material if both vats are used for the first processing only, the one-half dried material being held until such time can be taken to complete the second process. This arrangement permits a steady and continuous operation of the plant because in the event that the raw material becomes short for a day or two immediately all or any of the vats may be used for the second processing. Thus a plant with very simple equipment, therefore of small cost, can handle very much larger quantities of raw material and at the same time handle the same at a lower cost, due to the uninterrupted and continuous use of all vats at all times.

The said fish meal unmixed with any other substance is ready for animal food but being very rich is usually supplied in small quantities mixed with other foods.

I claim :—

1. The process of recovering products from fish which comprises heating said fish until the free moisture is eliminated, and expressing the oil to a point where a thick, heavy, viscous fluid or glue and oil emulsion appears.

2. The process of recovering products from fish which comprises heating said fish until the free moisture is eliminated, expressing the oil to a point where a thick, heavy, viscous fluid or glue and oil emulsion appears, and re-heating the fish meal to dryness.

3. The process of recovering products from fish of the shark family which comprises heating said fish until the free moisture is eliminated, and expressing the oil to a point where a thick, heavy, viscous fluid or glue and oil emulsion appears.

4. The process of recovering products from fish of the shark family which comprises heating said fish until the free moisture is eliminated, expressing the oil to a point where a thick, heavy viscous fluid or glue and oil emulsion appears, and re-heating the fish meal to dryness.

5. The process of recovering products from fish which comprises heating said fish and then expressing the oil, said heating being continued to a point where there remains after said expressing of the oil but approximately fifty to sixty per cent of moisture content and said expression of oil continuing until a thick, heavy, viscous fluid or glue and oil emulsion appears.

6. The process of recovering products from fish which comprises heating said fish to evaporate moisture therefrom, said evaporation continuing until the capillary interstices of the mass are for the most part filled with moisture and then expressing the oil to a point where a thick, heavy, viscous fluid or glue and oil emulsion appears, and then re-heating the residue to dryness.

7. The process of recovering products from fish which comprises heating said fish until the free moisture is eliminated, expressing the oil to a point where a thick, heavy, viscous fluid or glue and oil emulsion appears, and continuing the expressing to separately collect the oil emulsion and glue stock.

8. The process of recovering products from fish which comprises heating said fish until the free moisture is eliminated, expressing the oil to a point where a thick, heavy, viscous fluid or glue and oil emulsion appears, re-heating the fish meal to dryness, and continuing the expressing to separately collect the oil emulsion and glue stock.

9. The process of recovering products from fish which comprises drying said fish to a point where the eyeball tissue becomes translucent excepting the outer coating of about one thirty-second of an inch, expressing the oil to a point where a viscous fluid or glue and oil emulsion appears, re-heating and drying the resulting fish meal to dryness.

10. As an article of manufacture, fish meal with the original plant and animal liquid food elements retained.

11. As an article of manufacture, fish meal produced by expressing the liquid content of fish after the free moisture is eliminated.

12. As an article of manufacture fish meal recovered by heating fish until the free moisture is eliminated, expressing the oil to a point where a thick heavy viscous fluid or glue and oil emulsion appears and reheating the fish meal to dryness.

13. As an article of manufacture fish meal recovered by drying fish to a point where the eyeball tissue becomes translucent excepting the outer coating of about one thirty second of an inch, expressing the oil to a point where a viscous fluid or glue and oil emulsion appears, reheating and drying the resulting fish meal to dryness.

In witness whereof, I hereunto subscribe my name this 15th day of April, A. D. 1919.

ROBERT M. THOMPSON.